(12) United States Patent
Berner et al.

(10) Patent No.: US 12,316,902 B2
(45) Date of Patent: May 27, 2025

(54) SYNCHRONIZING MEDIA CONTENT TAG DATA

(71) Applicant: Adeia Media Solutions Inc., San Jose, CA (US)

(72) Inventors: Mark Berner, Santa Clara, CA (US); David Chamberlin, Pacifica, CA (US); Kevin P. Smith, Mountain View, CA (US)

(73) Assignee: ADEIA MEDIA SOLUTIONS INC., San Jose, CA (US)

( * ) Notice: Subject to any disclaimer, the term of this patent is extended or adjusted under 35 U.S.C. 154(b) by 0 days.

(21) Appl. No.: 18/373,497

(22) Filed: Sep. 27, 2023

(65) Prior Publication Data

US 2024/0056628 A1    Feb. 15, 2024

Related U.S. Application Data

(63) Continuation of application No. 17/159,859, filed on Jan. 27, 2021, now Pat. No. 11,805,291, which is a
(Continued)

(51) Int. Cl.
*H04N 21/43* (2011.01)
*G06F 16/70* (2019.01)
(Continued)

(52) U.S. Cl.
CPC ....... *H04N 21/43074* (2020.08); *G06F 16/70* (2019.01); *G06F 16/9014* (2019.01);
(Continued)

(58) Field of Classification Search
CPC ............... G06F 16/9014; G06F 16/70; H04N 21/23439; H04N 21/235; H04N 21/2353; H04N 21/2358; H04N 21/4147; H04N 21/432; H04N 21/4325; H04N 21/435; H04N 21/4358; H04N 21/44008; H04N 21/44209; H04N 21/45457; H04N 21/47217; H04N 21/812; H04N 21/8352; H04N 21/8455; H04N 21/8456; H04N 21/433
See application file for complete search history.

(56) References Cited

U.S. PATENT DOCUMENTS 7,827,182 B1    11/2010  Panigrahy
8,155,507 B2    4/2012   Lee
(Continued)

FOREIGN PATENT DOCUMENTS

JP    2007110188 A    4/2007
JP    2009542088 A    11/2009
(Continued)

*Primary Examiner* — Jefferey F Harold
*Assistant Examiner* — Franklin S Andramuno
(74) *Attorney, Agent, or Firm* — HALEY GUILIANO LLP

(57) ABSTRACT

Tag data is created from in-band data in a media content item by a remote location while the media content item is being broadcasted by a content provider and received by the remote location. The tag data identifies locations in the media content item which enables media devices to accurately jump to particular locations in the media content item based on the tag data.

16 Claims, 6 Drawing Sheets

Related U.S. Application Data continuation of application No. 16/726,732, filed on Dec. 24, 2019, now Pat. No. 11,070,866, which is a continuation of application No. 15/283,214, filed on Sep. 30, 2016, now abandoned.

(60) Provisional application No. 62/235,542, filed on Sep. 30, 2015.

(51) Int. Cl.
  *G06F 16/901* (2019.01)
  *H04N 21/2343* (2011.01)
  *H04N 21/235* (2011.01)
  *H04N 21/4147* (2011.01)
  *H04N 21/432* (2011.01)
  *H04N 21/433* (2011.01)
  *H04N 21/435* (2011.01)
  *H04N 21/44* (2011.01)
  *H04N 21/442* (2011.01)
  *H04N 21/4545* (2011.01)
  *H04N 21/472* (2011.01)
  *H04N 21/81* (2011.01)
  *H04N 21/8352* (2011.01)
  *H04N 21/845* (2011.01)

(52) U.S. Cl.
  CPC ..... *H04N 21/23439* (2013.01); *H04N 21/235* (2013.01); *H04N 21/2353* (2013.01); *H04N 21/2358* (2013.01); *H04N 21/4147* (2013.01); *H04N 21/432* (2013.01); *H04N 21/4325* (2013.01); *H04N 21/435* (2013.01); *H04N 21/4358* (2013.01); *H04N 21/44008* (2013.01); *H04N 21/44209* (2013.01); *H04N 21/45457* (2013.01); *H04N 21/47217* (2013.01); *H04N 21/812* (2013.01); *H04N 21/8352* (2013.01); *H04N 21/8455* (2013.01); *H04N 21/8456* (2013.01); *H04N 21/433* (2013.01)

(56) References Cited

U.S. PATENT DOCUMENTS

| | | |
|---|---|---|
| 8,185,507 B1 | 5/2012 | Kaminski |
| 8,620,144 B2 | 12/2013 | Barton et al. |
| 2004/0015441 A1 | 1/2004 | Ebihara et al. |
| 2006/0143560 A1* | 6/2006 | Gupta ................. G06F 16/7867 715/202 |
| 2007/0036519 A1 | 2/2007 | White |
| 2007/0110237 A1* | 5/2007 | Tehranchi .......... H04N 21/2347 348/E7.056 |
| 2007/0300249 A1 | 12/2007 | Smith et al. |
| 2011/0004897 A1* | 1/2011 | Alexander ......... H04N 21/2668 725/32 |
| 2011/0110646 A1 | 5/2011 | Smith et al. |
| 2012/0233417 A1* | 9/2012 | Kalach ................ G06F 11/1453 711/E12.103 |
| 2013/0247091 A1 | 9/2013 | Wong |
| 2013/0332836 A1 | 12/2013 | Cho |
| 2014/0181866 A1 | 6/2014 | Hall |
| 2014/0289754 A1 | 9/2014 | Riethmueller |
| 2016/0314478 A1 | 10/2016 | Krasnikov |
| 2017/0017551 A1* | 1/2017 | Nichols ............... H04L 67/1095 |
| 2017/0064349 A1* | 3/2017 | Jabara ................ H04N 21/8133 |
| 2021/0211763 A1 | 7/2021 | Berner et al. |

FOREIGN PATENT DOCUMENTS

| | | |
|---|---|---|
| JP | 2013150221 A | 8/2013 |
| WO | 2014022235 A1 | 2/2014 |

* cited by examiner

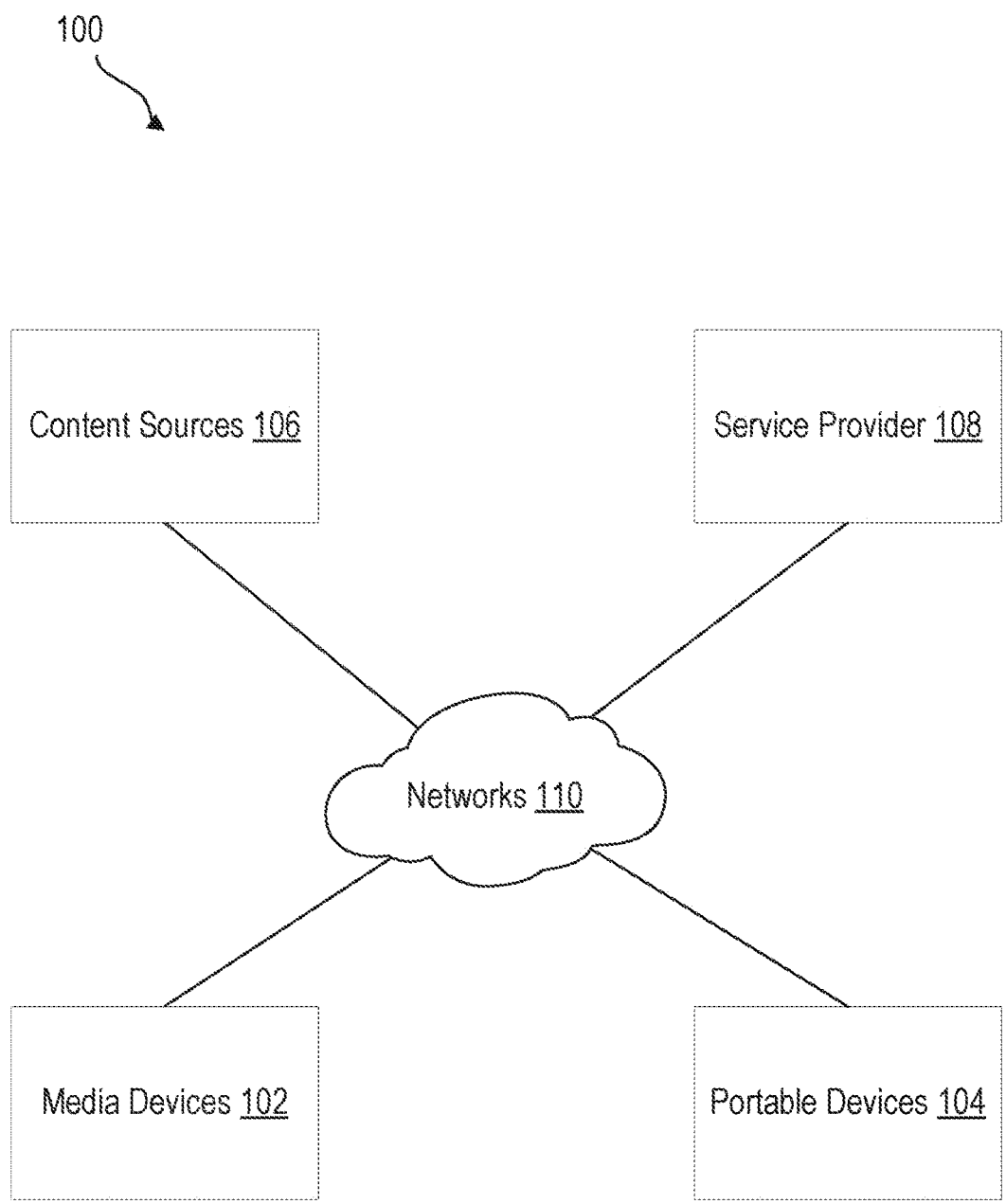

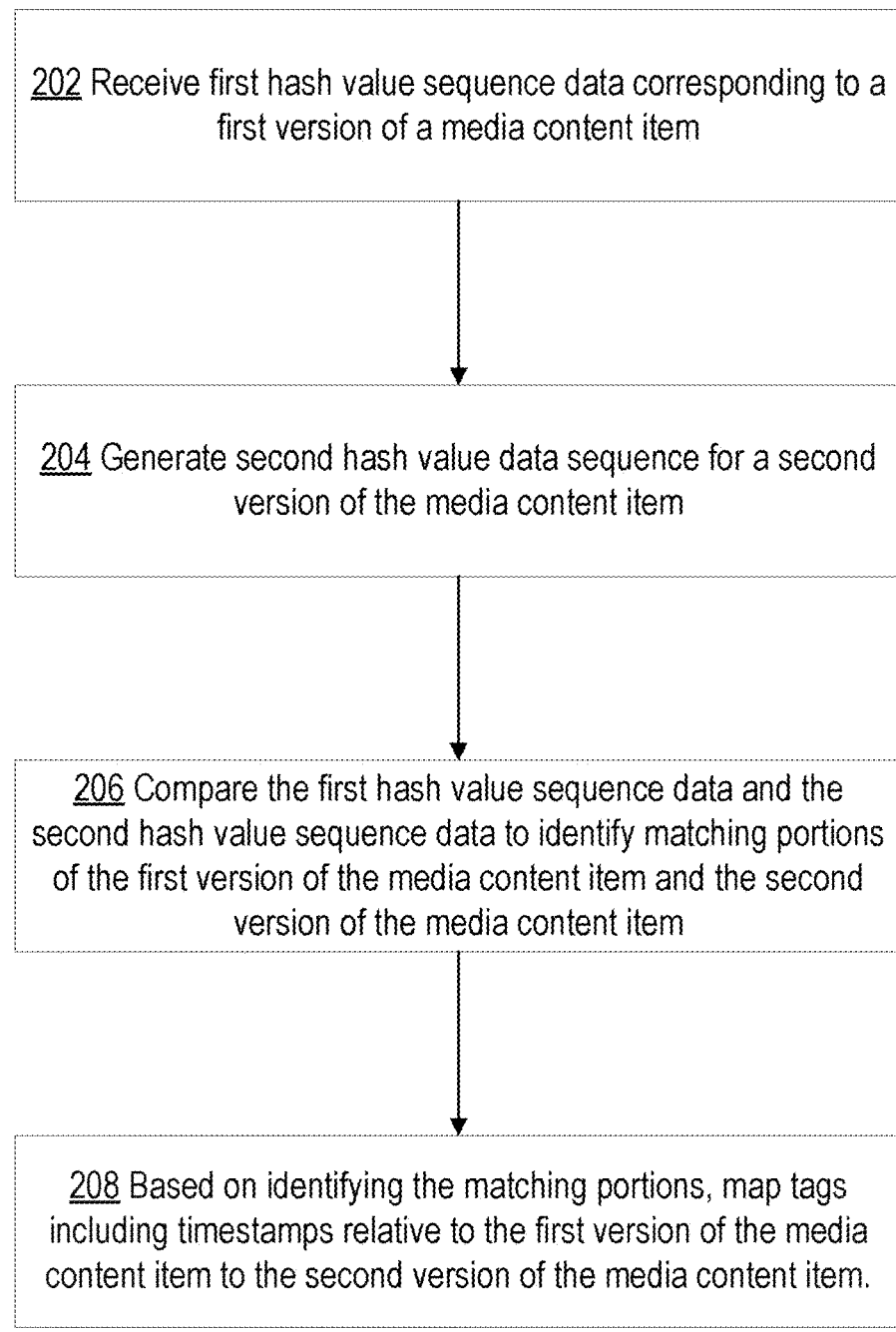

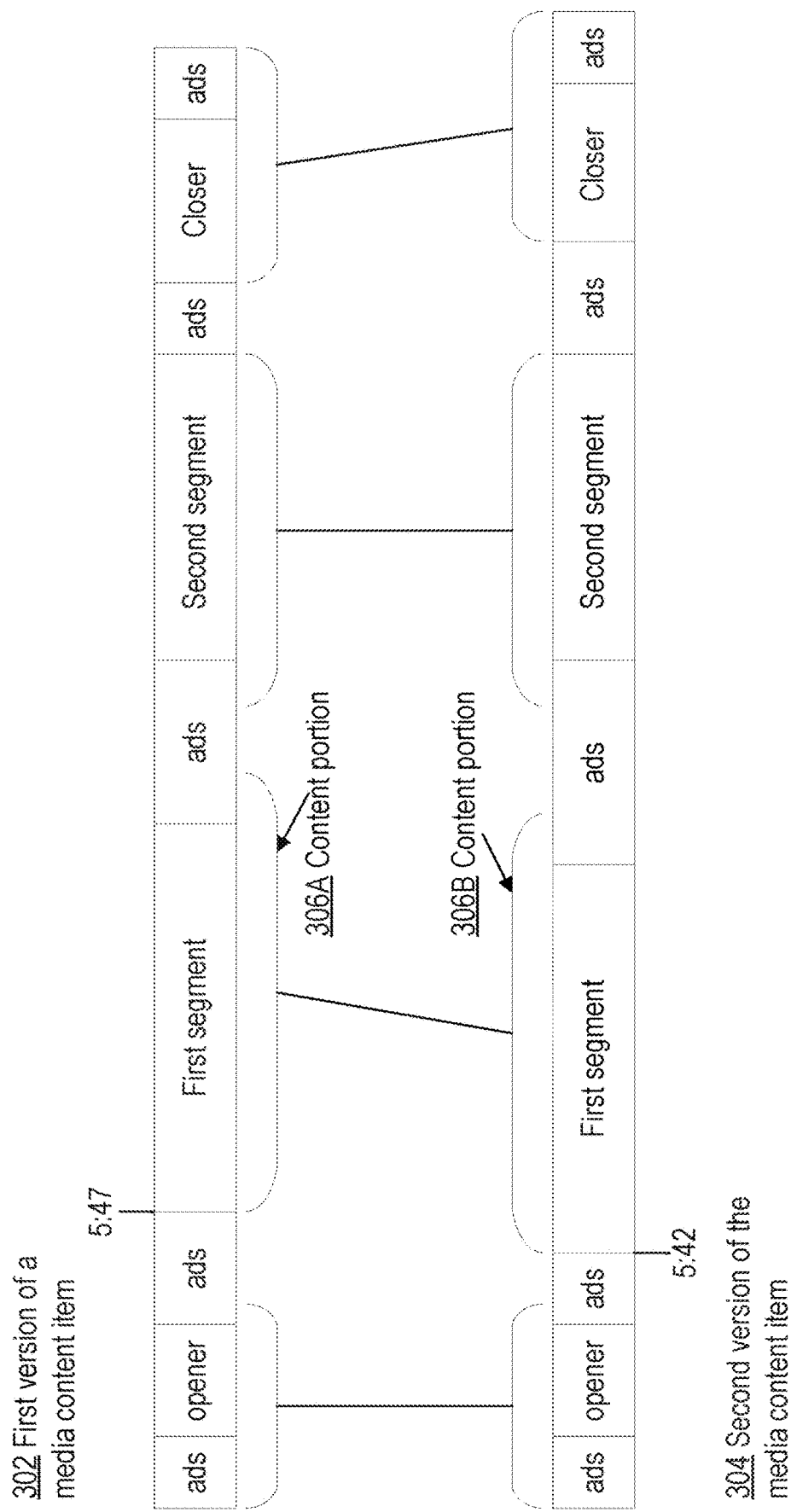

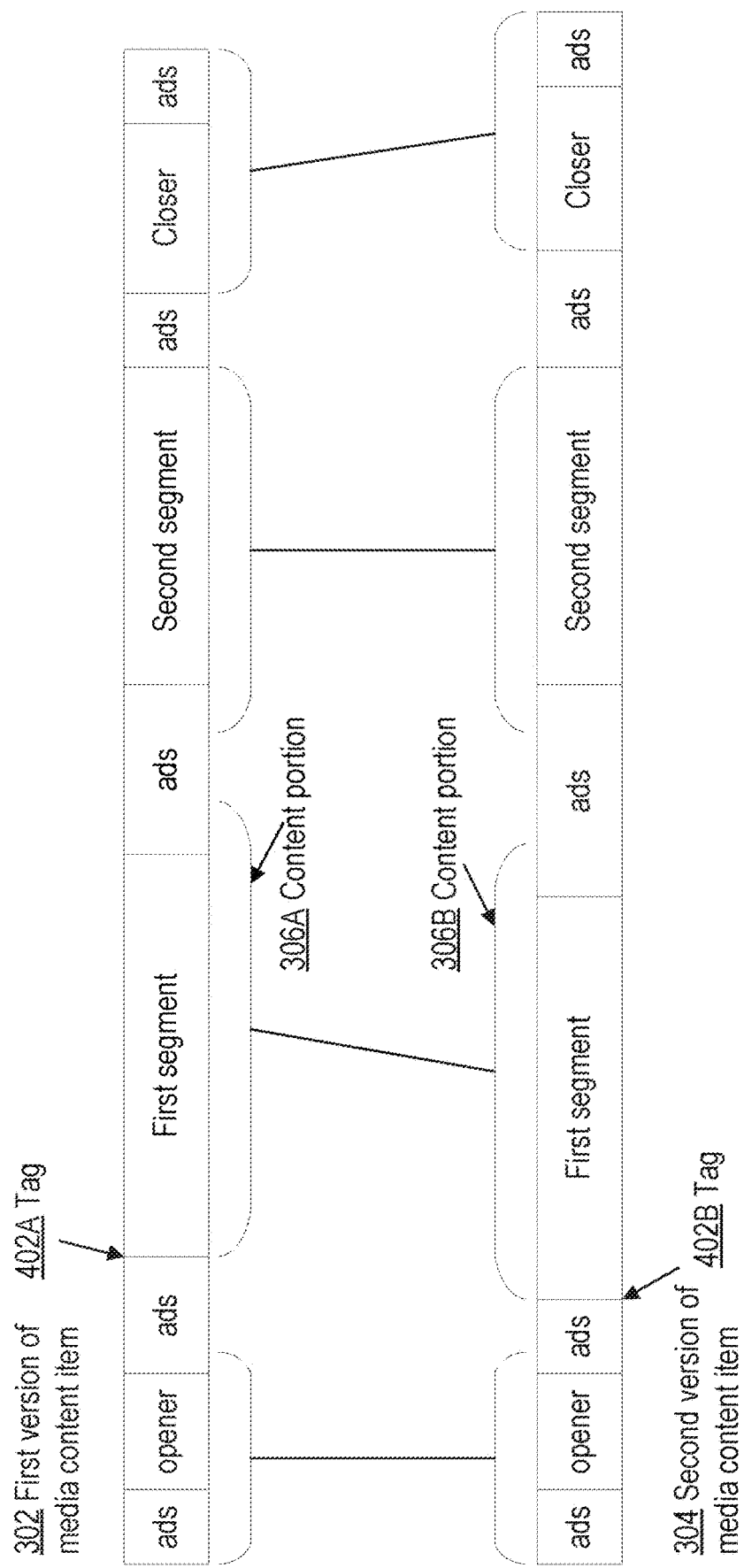

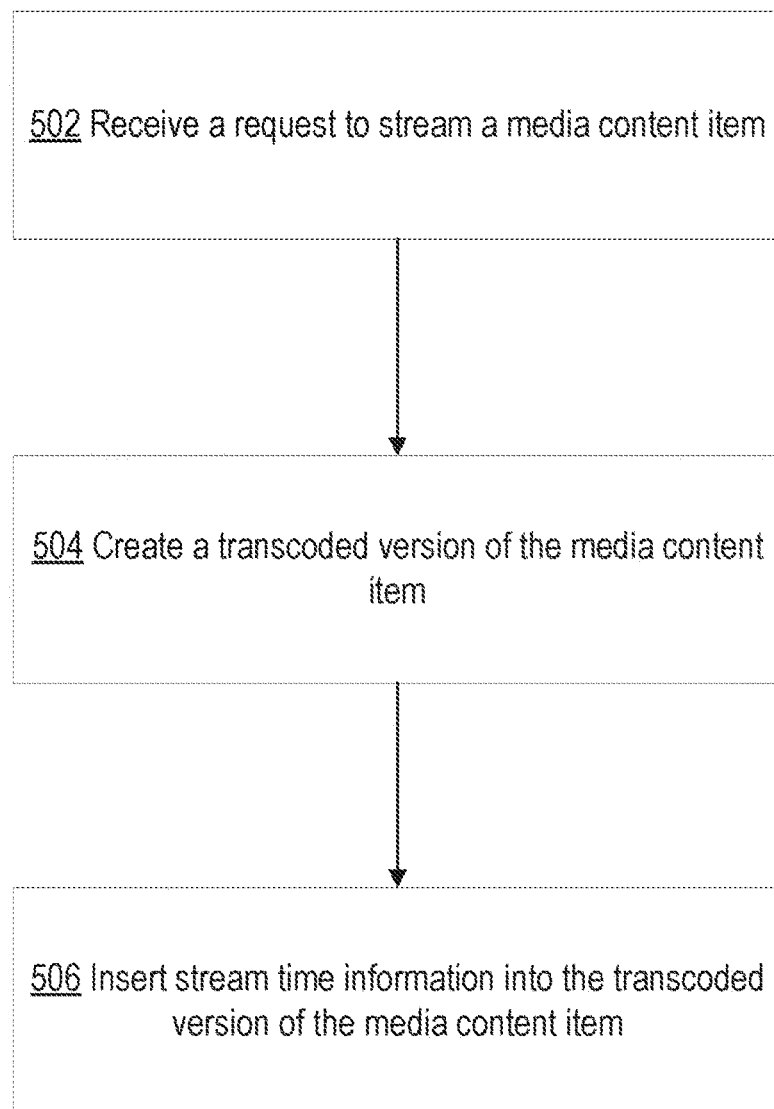

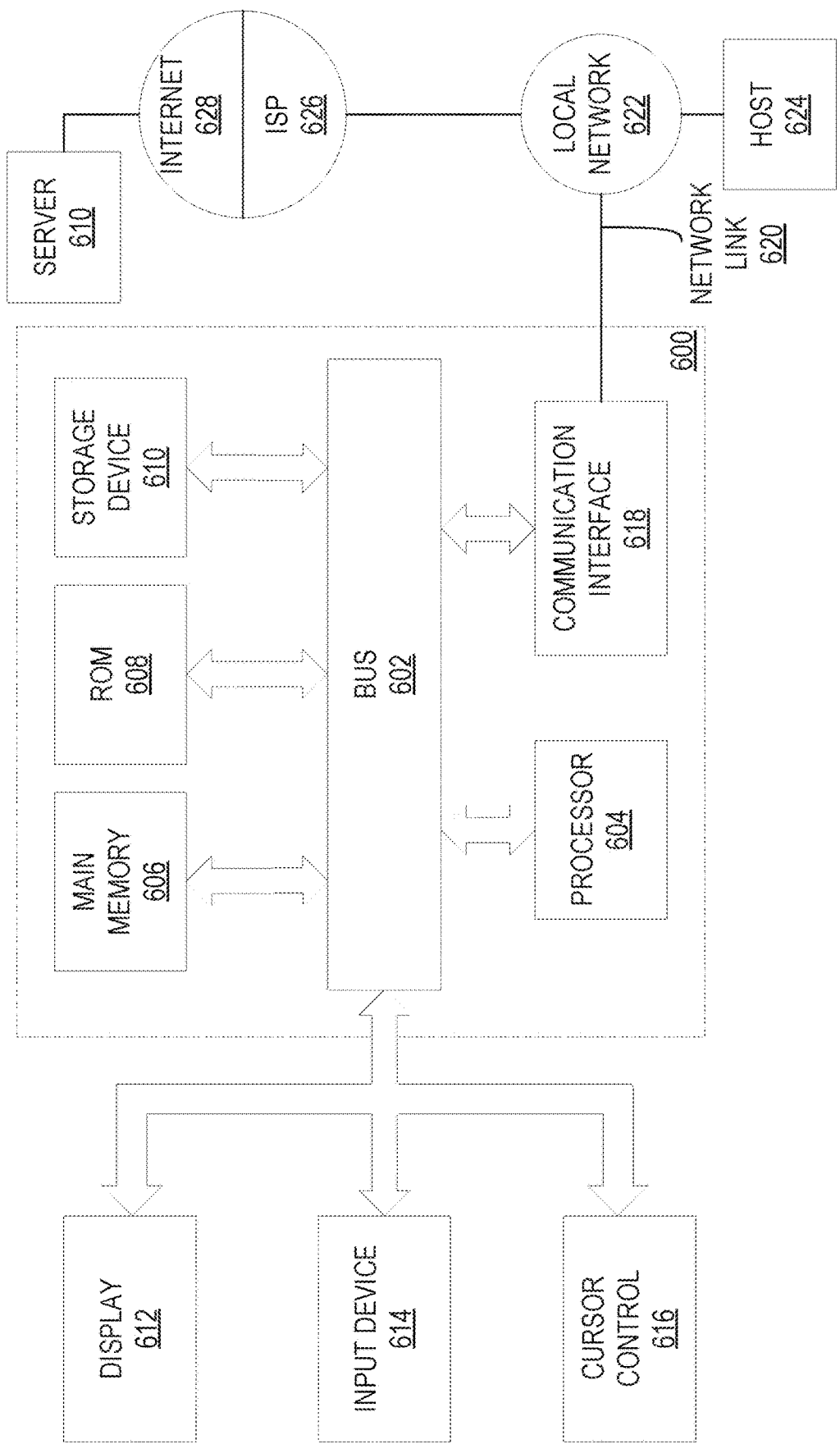

SYNCHRONIZING MEDIA CONTENT TAG DATA

PRIORITY CLAIM

This application is a continuation of U.S. patent application Ser. No. 17/159,859, filed Jan. 27, 2021, which is a continuation of U.S. patent application Ser. No. 16/726,732, filed Dec. 24, 2019, now U.S. Pat. No. 11,070,866, which is a continuation of U.S. patent application Ser. No. 15/283,214, filed Sep. 30, 2016, which claims benefit under 35 U.S.C. § 119(e) of Provisional Application No. 62/235,542, filed Sep. 30, 2015, the entire contents of which are hereby incorporated by reference.

TECHNICAL FIELD

Embodiments relate generally to the processing of multimedia audio and video streams. Embodiments relate more specifically to tagging segments of media content streams and synchronizing tagged segments across media devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Media content broadcasted by content providers typically comprises several separate program intervals interspersed with commercial breaks. For example, a broadcasted television program may begin with an initial opening program segment, followed by a commercial break, followed by another program segment, followed by another commercial break, and so forth. Typically, a commercial break is of a limited duration that is less than the duration of the program intervals that precede and/or follow that commercial break and during the commercial breaks the broadcaster typically broadcasts one or more advertisements.

Users are often more interested in the content that occurs during the program segments than in advertisement content that occurs during the commercial breaks. As a result, users may often use a media device's fast forwarding feature in an attempt to at least partially fast forward through commercial breaks so that the user does not need to spend time watching advertisements. However, operating the fast forwarding feature during each commercial break can be inconvenient, and a user's ability to precisely fast forward to the next program segment may be limited, particularly if the user fast forwarding through the advertisements at a high rate.

BRIEF DESCRIPTION OF THE DRAWINGS

In the drawings:

FIG. 1 illustrates a networked computer environment in which an embodiment may be implemented;

FIG. 2 is a flow diagram that illustrates a process for synchronizing tag data created relative to a first version of a media content item with other versions of the same media content item, in accordance with the disclosed embodiments;

FIG. 3 illustrates an example of comparing hash value sequence data for two different versions of the same media content item, in accordance with the disclosed embodiments;

FIG. 4 illustrates an example of synchronizing tag data based on an identification of matching portions between two versions of the same media content item, in accordance with the disclosed embodiments;

FIG. 5 is a flow diagram that illustrates a process for skip accuracy for transcoded content, in accordance with the disclosed embodiments;

FIG. 6 illustrates a computer system upon which an embodiment may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Operating Environment
3.0. Functional Overview
   3.1. Media Content Tag Creation
   3.2. Media Content Tag Synchronization
   3.3. Tag Synchronization for Transcoded Content
   3.4. Tag Quality Assurance
   3.5. Automatic Segment Detection
4.0. Implementation Mechanism—Hardware Overview
5.0. Extensions and Alternatives

1.0. GENERAL OVERVIEW

Approaches, techniques, and mechanisms are disclosed related to creating tag data that identifies segments of media content items, and enabling media devices to accurately jump to particular locations in a media content item based on remotely created tag data. In this context, a "segment" of a media content item generally refers to a span of time within an entire media content item, where a media content item may include, for example, a broadcasted television program, movie, sporting event, or any other type of media content.

A typical broadcasted media content item may contain a number of separate segments broadcasted as a continuous media content stream. For example, a typical sitcom television program may include an initial intro segment, followed by a segment containing one or several commercials, followed by more program content, followed by another segment of commercials, and so forth. As another example, a sporting event such as the Olympics may include a first segment consisting of twenty minutes of diving, followed by five minutes of commercials, followed by fifteen minute segment of weightlifting, followed by a twelve minute segment of fencing, and so forth.

In an embodiment, creating tag data for a media content item refers generally to one or more processes for generating metadata or other information that identifies the boundaries of segments within a media content item. Tag data for the example sitcom television program described above, for example, may indicate that the intro segment starts at time 0:03 into the media content stream, the first commercial segment starts at time 5:14, the first program content segment starts at time 8:02, and so forth. In general, such tag data may be used to enable a user to "jump" to a particular desired segment from any other location in the media content item. For example, a user viewing the example sitcom television program may view the show's intro segment and upon reaching the first commercial segment, provide input that causes the user's media device to jump to the content segment at time 8:02, bypassing the preceding commercial segment. Such input may include, but is not limited to, a user input on a remote control, a user input on a portable device such as a mobile device, where the portable device is used as a second screen, and so forth. User inputs may include pressing a button on the remote control, a mouse click on a device, a tap on a touch screen enabled device, a gesture on a gesture-enabled device, and the like.

In one example, such tag data may be generated and provided by a service provider for the benefit of users of media devices associated with the service provider. In this example, a service provider may manage a group of human "taggers" tasked with viewing particular media content items (e.g., first airings of television programs, sporting events, etc.) and identifying segment transitions in the media content items to create tag data for distribution to other media devices. Users of the media devices associated with the service provider may then receive or otherwise access the tag data created by the service provider, enabling the users to navigate the media content items based on the segment boundaries identified by the taggers. In other examples, tag data may be created by individual users or other sources and shared among media devices.

In one embodiment, a user's media device may be configured to synchronize tag data created by a service provider or other remote source with the media device's locally stored copies of media content items. In general, the process of synchronizing remotely created tag data enables a media device to account for differences in the version of the media content item received and stored by the media device relative to the version of the media content item used to create the tag data. The differences may include, for example, different commercials broadcasted in different geographic regions, different commercial segment durations, and other regional variations in broadcasted media content items.

In one embodiment, techniques are provided for improving the ability of media devices that receive streaming copies of media content items to use tag data associated with the media content items. For example, a user may initially record a television program or other media content item using a host media device (e.g., a local DVR or a cloud-based DVR system). The user may then later request playback of the television program using a portable device, such as a mobile device or tablet computer, and the host media device may transcode the television program into a format suitable for streaming playback by the portable device. In one embodiment, because a portable device may not be able to store an entire local copy of the media content item, a host media device may be configured to embed additional timing metadata into a transcoded media content stream that enables portable media devices to use tag data accurately.

In an embodiment, a computing device is configured to automatically identify possible segment transitions within a media content item. For example, various characteristics of a media content item may be analyzed to determine points in a media content item that are likely to correspond to segment transitions. Examples of characteristics that may be used to identify possible segment transition points in the media content item include, but are not limited to, changes in the style of closed caption text associated with the media content item, changes in the audio level of a media content item, detecting instances of scene blanking, databases of known advertisements, etc.

2.0. OPERATING ENVIRONMENT

FIG. 1 is a block diagram of an example system 100 for creating and synchronizing tag data, in accordance with one or more embodiments. System 100 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, a system 100 includes one or more media devices, including media devices 102 and portable devices 104. As used herein, a media device 102 and portable device 104 generally refers to any type of computing device capable of receiving media content items, such as television programs, movies, video on demand (VOD) content, etc., from a cable signal, terrestrial signal, digital network-based data, another media device, etc. In FIG. 1, for example, a media device 102 may include a TV-tuner input that can be used to play, record, stream, and/or otherwise access media content items received from one or more content sources 106. For example, one content source 106 may include a live television feed that is provided by a cable operator; other example content sources 106 include, but are not limited to, Video On Demand (VOD) libraries, third party content providers (e.g., Netflix®, Amazon Prime®, etc.), web-based media content, satellite broadcast content, terrestrial broadcast content, etc. Example media devices 102 include, but are not limited to, a set-top box (STB), digital video recorders (DVRs), personal computers, tablet computers, handheld devices, televisions, and other computing devices.

In an embodiment, system 100 may further include one or more IP-enabled portable devices 104. In general, an IP-enabled media device 104 may refer to any type of computing device that is capable of receiving media content over one or more digital networks 110, such as the public Internet, intranet, LAN, WAN, etc., but which may or may not include a TV-tuner input. Examples of portable devices 104 include, without limitation, STBs, DVRs, personal computers, smartphones, tablets, laptops, game devices, media servers, digital media receivers, televisions, terrestrial antennas, etc. A typical user may own several media devices 102 and/or portable devices 104, which may be located and used at various locations throughout the user's home and elsewhere.

In an embodiment, media devices 102 and portable devices 104 are coupled to a service provider 108 via one or more networks 110. Networks 110 broadly represent one or more LANs, WANs, cellular networks (e.g., LTE, HSPA, 3G, older technologies, etc.), and/or internetworks using any of wired, wireless, terrestrial microwave, or satellite links, and may include the public Internet. Furthermore, each media device 102 and portable device 104 may be coupled to one or more other media devices via one or more networks 110.

In an embodiment, a service provider 108 may be configured to provide various services to media device 102 and portable device 104. As described in more detail herein, a service provider 108 may be configured to enable the creation of tag data for various media content items, and to provide tag data to media devices 102 and portable devices 104.

As described in more detail hereinafter, each media device 102 may be configured to perform various actions with respect to media content items, including receiving media content items from content sources 106, playing media content items, scheduling recordings of media content items, streaming media content items to other media devices, etc.

System 100 illustrates only one of many possible arrangements of components configured to provide the functionality described herein. Other arrangements may include fewer, additional, or different components, and the division of work between the components may vary depending on the arrangement.

In FIG. 1, the various components of system 100 are depicted as being communicatively coupled to various other components by arrows. These arrows illustrate only certain examples of information flows between the components of system 100. Neither the direction of the arrows nor the lack of arrow lines between certain components should be interpreted as indicating the existence or absence of communication between the certain components themselves. Indeed, each component of system 100 may feature an open port, API, or other suitable communication interface by which the component may become communicatively coupled to other components of system 100 as needed to accomplish any of the functions of system 100 described herein.

3.0. FUNCTIONAL OVERVIEW

Approaches, techniques, and mechanisms are described that enable creation of tag data identifying segments of media content items, and that further enable synchronization of the tag data across any number of media devices. Further described are techniques for using tag data with transcoded versions of media content items for streaming playback, techniques for improving the quality of tag data created by human taggers, and techniques for automatically detecting segment transitions within media content items, among other features.

3.1. Media Content Tag Creation

In an embodiment, tag data is created to identify various segments within one or more media content items. For example, tag data generally may include any data that identifies time positions within a media content item. For example, tag data created for a particular television program may indicate a beginning and/or ending time associated with various commercial breaks, segments of the program, user-defined clips, etc. The tag data may be used, for example, to enable users to efficiently navigate to particular locations within a media content item, enable media devices to skip over particular segments (e.g. skip over commercial segments), among other uses.

In one embodiment, a service provider (e.g., a service provider 108) may create tag data for media content items to enable users of media devices (e.g., media devices 102 and/or portable devices 104) to navigate to various points within a media content items more efficiently. A service provider 108 may send tag data created for particular media content items, for example, upon detecting that the media content item has been recorded at by a media device, or in response to a user requesting the tag data for one or more particular media content items.

In one embodiment, a service provider may create tag data for media content items using human taggers. For example, a human tagger associated with a service provider may create tag data by identifying segment transitions as the tagger views a particular media content item. For example, a human tagger may use a media device to watch a first airing of a television program. The media device may further interface with an input device that enables the tagger to specify locations in the media content item corresponding to segment transitions (e.g., from a program segment to a commercial segment, from a commercial segment back to a program segment, from one program to another, etc.). In an embodiment, each time the tagger views a segment transition, the tagger may provide input to the input device to create a new tag that identifies the segment transition location.

In an embodiment, each tag created by a tagger may be stored in association with a stream time reported by the media device corresponding to the location within the media content item specified by the tagger. In this context, stream time refers a time relative to the playback of the media content item stream, rather than based on an external clock. Thus, tag data for a particular media content item may comprise a collection of tags, each tag indicating a particular stream time within the media content item for the tag, and may include other information such as a type of segment identified (e.g., a commercial segment, program segment, etc.), one or more actions to perform when the tag is encountered (e.g., display an alert, automatically skip to the next segment, mute the volume, start or stop a recording, etc.), an identity of the tagger, and/or any other information.

In an embodiment, a media device used by a tagger may further create timing information for the entire version of the media content item as viewed by the tagger, where the timing information maps data derived from locations within the media content item to the stream time reported by the media device. One example of timing information may include hash value sequence data, which maps hash values derived from in-band data included with the media content item to associated stream times. For example, a media device may calculate one or more hash values for every completed sentence of closed caption data and associate a timestamp with the hash values.

3.2. Media Content Tag Synchronization

Tag data created for media content items, as described above, may generally comprise data identifying locations within a media content item based on time values reported by a media device at which the tag data is created. However, the same media content items received by other media devices (e.g., media devices located in geographic regions different from the location of the taggers) may contain differences relative to the version of the media content item viewed by the tagger. As one example, a version of a media content item received by one viewer may include commercial segments with locally broadcasted commercials that are not present in a second version of the same media content item received by another viewer. As another example, the overall duration of commercial segments may vary from one version of a media content item to another.

In general, differences between a first version of a media content item (e.g., a version used by a tagger to create tag data) and another version of the same media content item (e.g., a version recorded by a user located across the country from the human tagger) may result in inaccuracies when attempting to use tag data that specifies time values relative to one of the versions. The first version of a media content item, or a reference version, may be used as the standard to which all other versions may be synchronized. In this way, the other versions, such as locally recorded versions by users, may be normalized by the media device receiving the tag data identifying the differences between the reference version and the other version(s). Thus, in one embodiment, a media device receiving tag data from a remote source may perform one or more steps to synchronize the tag data with a version of the associated media content item received by the media device.

FIG. 2 is a flow diagram illustrating a process for synchronizing tag data created for a reference version of a media content item with a different version of the same media content item received by a different media device. In one embodiment, at a high level, a media device may synchronize remotely created tag data with a locally stored version of a media content item by comparing timing information created for a reference version of the media content item upon which the tag data is based with timing information created by the media device for the locally stored version of the media content item, and then mapping the tag data based on the comparison of the timing information.

At block 202, a media device receives first hash value data sequence corresponding to a first version of a media content item. The first version of the media content item may, for example, be television program or other content scheduled for recording at the media device. As indicated above, a media device 102 may, for example, receive the first hash value data sequence from a service provider 108 that has created tag data for a particular media content item. For example, closed caption data may be transformed such that the catchphrase "BAZINGA, those trains are cool!" is received as a first hash value data sequence using one or more hash functions, such as MD5. The hash value data sequence for "BAZINGA, those trains are cool!" using the MD5 hash function is "e195df76df3bd6b8b48b6c042560d1fc." One of the main characters of "BIG BANG THEORY" may utter this catchphrase at a specified stream time of the particular media content item. The media device may request and receive the first hash value data sequence in response to scheduling a recording of the particular media content item, in response to user input requesting the data for the particular media content item, or based on any other event.

At block 204, a media device creates second hash value data sequence for a second version of the media content item. For example, similar to the process described above for creating hash value data sequence at a tagger's media device, a media device receiving a media content item may create local timing information by feeding data derived from the media content item (e.g., closed caption data, etc.) into a hash function and associate the resulting hash values with a stream time reported by the media device. Returning to the previous example, the media device receiving the locally stored version of the media content item may feed the closed caption data of the utterance, "BAZINGA, those trains are cool!" into the MD5 hash function and associate the resulting hash values with the stream time reported by the media device. Thus, a media device can process a media content item to create local timing information comprising mappings of hash values and stream time values. In general, any process can be used to generate the local timing information that is consistent with the process for generating the timing information by the tagger.

At block 206, the media device compares the first hash value data sequence and the second hash value data sequence to identify matching portions of the reference version of the media content item and the locally stored version of the media content item. For example, the media device may determine that a portion of a first version of a media content item and a portion of a second version of the media content item are similar by determining that a series of hash values from the first hash value data sequence is the same or is similar to a series of hash values from the second hash value data sequence. Returning again to our example, the hash value data sequence for "BAZINGA, those trains are cool!" "e195df76df3bd6b8b48b6c042560d1fc," may be compared in the different versions to identify matching portions of the reference version and the locally stored version the media content item.

FIG. 3 illustrates an example of identifying matching portions of two versions of a media content item by comparing hash value data sequence for the two different versions. For example, FIG. 3 illustrates a first version 302 and a second version 304 of the same media content item. In the particular example of FIG. 3, for example, the media content item may represent a television sitcom including an opening segment, first segment, second segment, and closer segment, with each of the segments interspersed with commercial breaks.

As described above, separate timing information (e.g., hash value data sequence) may be created for each of the first version 302 and the second version 304 of the media content item. Both instances of the timing information may, for example, comprise a table or other data structure that maps hash values with stream times reported by the device playing back the respective version of the media content item. In the previous example above, the hash value data sequence for the text string, "BAZINGA, those trains are cool!" may include "e195df76df3bd6b8b48b6c042560d1fc" using the MD5 hash function. This hash value data sequence may be mapped to a stream time reported by the device playing back the respective versions of the media content item. Thus, for a first version, or the reference version, of the media content item, a first entry in a data structure may be "1, e195df76df3bd6b8b48b6c042560d1fc. [0003]" which represents data values in a row of a table where the elements include, the version number, the hash value of the uttered catchphrase, and a start time value in seconds in relation to the stream time of the media content item as reported by the device playing back the version of the media content item. A second entry in the data structure for a second version may be "2, e195df76df3bd6b8b48b6c042560d1fc, [0005]" which identifies the same catchphrase appearing 2 seconds later.

As illustrated in FIG. 3, a comparison of the timing information for each of the versions has resulted in several matching portions, including matching content portions 306A and 306B. As further illustrated in FIG. 3, matching content portions 306A and 306B may not start at exactly the same time relative to the beginning of the respective versions of the media content items (e.g., due to different lengths of the preceding commercial segments). In FIG. 3, for example, timing information for the first version of the media content item 302 may report that the content portion 306A starts at time 5:47, while timing information for the second version of the media content item 304 starts at time 5:42.

At block 208, based on identifying the matching portions at block 206, the media device maps tag data created for the first version of the media content item to the second version of the media content item. For example, mapping the tag data generally may include accounting for differences in the starting position of various matching portions of the media content item (e.g., accounting for the difference start times of matching content portions 306A and 306B of FIG. 3). A media device may map tag data when it is received, or may map the tag data dynamically during playback of the second version of the media content item.

FIG. 4 illustrates an example of mapping tag data based on identifying matching portions of two different versions of a media content item. For example, a human tagger may have created tag data for the first version of the media content item 302, including a tag 402A that identifies the beginning of the first segment of the media content item. As described above in reference to FIG. 3, based on the comparison of timing information for the two different versions of the media content item, a media device may determine that a portion 306A corresponds to the portion 306B. As illustrated by the example of FIG. 4, timing differences determined by the matching process of block 206 may be accounted for by using the mapping of the matching segments. For example, a media device may determine that portion 306A from the first version of the media content item starts at time 5:47, whereas the same portion 306B in the second version of the media content item starts at time 5:42. Thus, if a tagger created tag 402A at the 5:20 point relative to the first version 302, then the media device may determine that the location of the corresponding tag 402B for the second version of the media content item 304 is at time 5:42.

In an embodiment, a process for synchronizing tag data may be configured to account for other types of variations between two versions of a media content item. For example, certain portions of a locally recorded version of a media content item may exhibit minor increases or decreases in the speed at which the content is played. A local broadcaster, for example, may slightly speed up playback of a portion of a media content item to increase the amount of time available for the insertion of commercials. As another example, a process for synchronizing tag data may be configured to tolerate some amount of errors or noise in in-band data from which timing data may be derived. For example, a media device may determine that a portion of a remote, or a reference, version of a media content item matches a locally recorded version of the same media content item, except the locally recorded version of the media content item includes several short gaps in the matching portion that do not match with the remote version. In this example, the media device may be configured to assume that the small gaps are the result of signal noise and to determine that the entire portions are matching. In one embodiment, a match threshold may be used to determine what percentage of timing information for any two portions of a media content indicate a match. As one example, a match threshold may be set at 80%, indicating that if 80% of timing information for a particular portion matches, the media device identifies the entire portions as matching portions. Various heuristic rules, such as the ones described above, may be used to determine matching portions of the different versions of the media content item.

As yet another example, a process for matching timing information may be configured to account for duplications of content within a particular media content item. For example, a particular television program may include a portion that depicts a particular scene, and a subsequent portion of the television program may include a "recap" that includes playing the particular scene a second time to remind viewers of what occurred during the previous scene. As a result of the same scene playing more than once within the same program, the timing information associated with a portion locally recorded version of the media content item may match with multiple portions of the remotely created timing information (e.g., a portion may match with both the first scene and the "recap" of the scene). As described above, the data structure storing the mapped hash value data sequences may include multiple portions of the reference tag timing information, stored as separate entries in the data structure. Thus, in one embodiment, a media device may be configured to match each portion of a locally recorded version of a media content item with a single portion of a remote version of the same media content item, where the matching portions occur in the same relative order to ensure a correct match.

In general, the processes of determining similarities between two versions of the same media content item, as described in reference to block 206 of FIG. 2, and mapping tag data using the determined similarities, as described at block 208, may be performed sequentially or concurrently. As described above, a media device may use the resulting mapped tag information to enable users to accurately jump to tagged locations in the media content, to accurately skip over segments (e.g., commercial segments), and to perform other operations.

3.3. Tag Synchronization for Transcoded Content

A wide variety of portable devices (e.g., portable devices 104) are capable of streaming media content for playback, and users of such portable devices may desire some or all of the same uses of tag data described above in relation to other media devices that are capable of recording entire copies of media content items. However, because many portable devices may not be capable of recording and storing entire copies of media content items, a portable device may be unable to create local timing information for the media content items in the same way as described above.

As one example, many types of portable media devices may support playback of remotely stored media content items using the HTTP Live Streaming (HLS) protocol. In general, the HLS protocol breaks a media content stream stored at a host device into a sequence of HTTP-based file downloads, where each download corresponds to a portion of the entire stream. The HLS standard, for example, generally divides a media content item into segments of a particular length (e.g., 2 seconds). When a portable device media player requests to play a remotely stored media content item transcoded using the HLS standard, the host device may provide the client media player with a list of URLs corresponding to the created segments. While the HLS protocol is used as an illustrative example here, other adaptive streaming formats may be used to support playback of remotely stored media content items. Also, though the term "transcoding" is used here, other processes of changing the format of a video or audio file while preserving some or all of the streams from the original file may be used, such as transmuxing.

If a portable device media player is streaming a media content item and requests to jump to a particular time within the media content item (e.g., jump to 3 seconds), the media player may send a request to the host device for the segment containing the requested time (e.g., if the segments are each 2 seconds long, the media player may request the segment that spans from 2-4 seconds). Because the request time point is in the middle of the requested segment, the media player may then jump 1 second into the received segment to arrive at the requested 3 second point.

One factor affecting the ability of a portable device to use tag data is related to the accuracy of the portable device's ability to "jump" to a particular point in time. A portable device's ability to jump to a particular time may be affected by a number of factors such as, for example, the frequency of Instantaneous Decoder Refreshes (IDRs) in the stream, which correspond to points in the media content stream where no previous information is necessary to decode the frame. The portable device's jump ability may also depend on the position and duration of the segment boundaries created during transcoding, as well as whether the portable device has the ability to position at points other than segment boundaries and/or IDR frames.

Some portable device media players enable some configuration of the accuracy with which the media player can jump to particular locations within a media content item. For example, some media players may enable users to specify an allowed tolerance in each direction of a requested time point. As another example, a media player may allow users to specify that the media player is allowed to position up to 1 second before or 0.5 seconds after the requested position.

As another example of a factor affecting a portable device's ability to use tag data, there may be a difference between the media playback time reported by a portable device media player and the media playback time from the original recording on the DVR for the same portion of the media content item. As an example, consider a recording of a media content item by a media device (e.g., a DVR), which starts at a media time of exactly zero seconds and whose video displays numbers indicating the number of seconds since the beginning of the video. In this case, if the media content item is playing on the media device, when the number 10 is displayed, the media time reported by the DVR is 10 seconds. However, if while streaming the media content item to a portable device, the portable device may report a time of 11 seconds while the number 10 is being displayed, then there is a discrepancy of one second between the portable device's idea of media time and the "true" media time. There may be a number of factors which can introduce inaccuracy here. For example, one factor is the difference between the time advertised in the segment playlist and the actual time of the video being transcoded. At least one reason why these discrepancies exist may be that the IDRs are not lining up with segment boundaries, and the portable device may only be able to jump to the IDRs, as previously described as points in the media content stream where no previous information is needed by the portable device to decode the frame.

In one embodiment, to enable portable devices to use remotely created tag data of a reference version of a media content item, timing metadata may be included with a transcoded media content stream. For example, a host media device serving a media content item as a media content stream, formatted using the HLS standard for example, may embed within the media content stream one or more tagged timestamps (e.g. reference version stream times) that cause a portable device to report back to the application the local timestamp when the portable device hits the tagged point(s) in the playback. In this manner, a media player of a portable device can determine the stream time that was on the host device for each frame of video that is being sent out currently. For example, the stream time may be inserted into the transcoded content, so that at any point the DVRs original local time may be determined, so that whatever variances arise from requesting that point by the portable device media player, the portable device can determine the reference version stream time of the DVR at that point.

In one embodiment, to improve the accuracy of jumps, a host media device may embed stream time information in the transcoded stream using timed metadata. This enables a portable device media player to compensate for the discrepancy between the time reported by the portable device and the true time of the stream. The embedded metadata further enables a portable device to use the same stream time-adjusted tag data used by the host media device since everything would be based on the host media device's reported stream time for the recording.

In one embodiment, a host media device is configured to insert the stream time (from the perspective of the host media device) in the transcoded stream as timed metadata. Whenever a portable device media player receives the timed metadata, it issues a callback to the application playing the media content stream with this stream time. The ad-skip functionality can monitor this stream time and compare it to the tag data. Once the stream time (as indicated by the timed metadata) hits the stream time for a segment as indicated in the tag data, the ad-skip functionality may be used to jump to the next tagged segment. In an embodiment, to determine an exact jump location, the portable device may look at the tag data to identify the stream time to which it is to jump. The portable device media player may then determine a current stream time and the current time reported by the portable device and issue a jump, for example, to current time+(jump point stream time−current stream time). In one embodiment, an offset may be determined as the current time added to the difference between the jump point stream time and the current stream time. In other embodiments, an offset may be determined dynamically based on timed metadata and locally reported stream time.

In an embodiment, the techniques described above may also be used in instances where the host media device is a cloud DVR system, or more generally, any time a client device does not have a complete copy of a media content item for which local timing information can be created. Although some examples above involved use of the HLS transcoding, the same processes could apply to other transcoding and streaming formats that allow for insertion of data into the stream.

FIG. 5 illustrates an example process for embedding stream time information into a transcoded copy of a media content item. At block 502, a host media device receives a request for a streaming copy of a media content item. For example, a user may use a mobile device to request playback of a media content item previously recorded and stored at the user's DVR device. As another example, a user may use a mobile device to request a copy of a media content item previously scheduled for recording by the user at a cloud DVR.

At block 504, a transcoded version of the media content item is created. The transcoded copy of the media content item may be created "on the fly" (e.g., in response to receiving the request to stream the media content item, or the transcoded copy may be created at any time before the request is received (e.g., a local DVR or cloud DVR system may create a transcoded copy of some or all recorded media content items even before any requests are received).

At block 506, the host media device inserts stream time information into the transcoded copy of the media content item. For example, the host media device may insert the stream time into a metadata field of the transcoded copy of the media content item.

In an embodiment, to further improve the jump accuracy for portable devices playing transcoded content, the jump functionality on the host media device may be configured to allow jumps to locations within a media content item which do not correspond to anchors. For example, the host media device may be configured jump directly to segment boundaries instead of the anchor closest to the segment boundary.

This, of course, would have the added benefit of making ad-skipping more accurate when playing on the DVR too.

In an embodiment, segments for a transcoded copy of a media content item can be aligned with anchors. If the segment boundaries for a transcoded copy of a media content item are aligned with anchor times, any inaccuracy due to anchor intervals relative to segment boundaries may be virtually eliminated.

In an embodiment, a cloud DVR may simplify some of the processes described above. For example, because a cloud DVR may be configured to generate a single transcode (per "personalized" recording) and store that transcoded file on the server, the issue of a stream time changing each time a jump occurs no longer exists. Furthermore, the segmentation of a media content item may be performed once and stored to the playlist, so that each time a segment is retrieved by a portable device, the video data corresponding to the segment remains the same.

In an embodiment, if a hash value matching algorithm, as described above, is performed on the server using the transcoded stream, and then downloaded to the cloud DVR, the same logic can be used as when playing a standard recording. For portable devices, the server's transcoder can embed the stream time into the transcoded copy the same way as with the on-the-fly-transcoding. Alternatively, the mobile device application may determine that it's dealing with cloud DVR and not to expect the stream time to be embedded.

3.3. Tag Quality Assurance

As described above in Section 3.1, a service provider may generate tag data for various media content items to enable other media devices to more easily navigate the media content items, skip commercial segments, and perform other functions. The accuracy of the initially created tag data is thus relevant to any other media device that uses the tag data. In one embodiment, to assist with improving the quality and accuracy of tag data when it is created, one or more tools may be provided that enable a human tagger and/or supervisor to monitor the accuracy tags during the tag creation process. For example, each time a human tagger creates a tag (e.g., to mark the start of a program segment) the tagger may desire to review the timing accuracy of the tag and to revise the tag if needed.

As described above, a human tagger may create tag data for a particular media content item using an input device synchronized with a media device playing the media content item and that enables the tagger to "mark" points of time within the media content item. For example, as the tagger is viewing a particular media content item, the tagger may press a button or otherwise provide input to indicate the start or end of a segment of interest within the media content item. In one embodiment, a system for creating tags may include a buffer that stores a portion of the currently viewed media content item, and which enables a tagger to rewind and review the accuracy of created tags.

In an embodiment, a supervisor may have access to a similar tool that can similarly review a buffer of recorded content. For example, when a tagger creates a new tag, a supervisor can use the buffer to rewind the media content item and review the accuracy of the created tag.

In one embodiment, when a tagger notices a segment transition, the tagger may provide input that causes the media content stream to jump back some amount of time (e.g., back 8 seconds) so that the tagger can prepare for marking the segment transition point. Once the tagger provides the input marking the transition point, the tagger can then start a review process where the portion of the media content item including the marked point is replayed and indicates to the user where the tag is in the content (e.g., by creating a flash or other display when the tagged location is hit).

In one embodiment, one or more media devices may record several episodes that are tagged for the purpose of quality control review. For example, several tagged episodes may be recorded each day so that the tagger can review and determine whether the tags are accurate.

3.4. Automatic Segment Detection

As described above, one technique for creating tag data involves human taggers viewing a media content item and manually identifying segments of interest within the media content item, for example, by using an input device to identify points of time corresponding to the beginning and/or end of the segments. In one embodiment, a media device may be configured to automatically detect segments within a media content item rather than relying on human taggers to identify segments. The automatic detection of segment boundaries within a media content item may be used to replace human tagging of media content items, or may be used to supplement human tagging and to assist with confirming the accuracy of human created tags.

In an embodiment, the automatic detection of media content item segment boundaries generally may include various analyses of a media content item, including detecting closed caption style changes from one segment to another, changes in the audio level between segments, scene blanking, fingerprinting the content and comparing fingerprints against a database of known segments, weighted combinations factors, etc. For example, detecting changes in closed caption styles may include detecting various changes in the formatting or other characteristics of closed caption data that may typically accompany a transition from a commercial segment to a program segment. As another example, detecting audio level changes may be based on measurements of audio levels of commercial segments relative to content segments In an embodiment, fingerprints may be derived from portions of a media content item and used to query a database of known segments. For example, a database may include a set of fingerprints for known commercials and which a media device may query to determine the presence of commercial segments in a media content stream.

In one embodiment, an automatic scene detection process may present to a user to a set of proposed tags corresponding to detected segment transition points, the accuracy of which may then be reviewed and confirmed by the user. For example, an automatic scene detection process may present a timeline of a media content item with the proposed segment transition points overlaid on the timeline. A user may then scan through the media content item and confirm whether or not the proposed tags are aligned with actual segment boundaries.

4.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

FIG. 6 is a block diagram that illustrates a computer system 600 utilized in implementing the above-described techniques, according to an embodiment. Computer system 600 may be, for example, a desktop computing device, laptop computing device, tablet, smartphone, server appliance, computing mainframe, multimedia device, handheld device, networking apparatus, or any other suitable device.

Computer system 600 includes one or more busses 602 or other communication mechanism for communicating information, and one or more hardware processors 604 coupled with busses 602 for processing information. Hardware processors 604 may be, for example, general purpose microprocessors. Busses 602 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 600 also includes a main memory 606, such as a random access memory (RAM) or other dynamic or volatile storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 a special-purpose machine that is customized to perform the operations specified in the instructions.

Computer system 600 further includes one or more read only memories (ROM) 608 or other static storage devices coupled to bus 602 for storing static information and instructions for processor 604. One or more storage devices 610, such as a solid-state drive (SSD), magnetic disk, optical disk, or other suitable non-volatile storage device, is provided and coupled to bus 602 for storing information and instructions.

Computer system 600 may be coupled via bus 602 to one or more displays 612 for presenting information to a computer user. For instance, computer system 600 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 612 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 612.

One or more input devices 614 are coupled to bus 602 for communicating information and command selections to processor 604. One example of an input device 614 is a keyboard, including alphanumeric and other keys. Another type of user input device 614 is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Yet other examples of suitable input devices 614 include a touch-screen panel affixed to a display 612, cameras, microphones, accelerometers, motion detectors, and/or other sensors. In an embodiment, a network-based input device 614 may be utilized. In such an embodiment, user input and/or other information or commands may be relayed via routers and/or switches on a Local Area Network (LAN) or other suitable shared network, or via a peer-to-peer network, from the input device 614 to a network link 620 on the computer system 600.

A computer system 600 may implement techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 600 can receive the data on the network and demodulate the signal to decode the transmitted instructions. Appropriate circuitry can then place the data on bus 602. Bus 602 carries the data to main memory 606, from which processor 604 retrieves and executes the instructions.

The instructions received by main memory 606 may optionally be stored on storage device 610 either before or after execution by processor 604.

A computer system 600 may also include, in an embodiment, one or more communication interfaces 618 coupled to bus 602. A communication interface 618 provides a data communication coupling, typically two-way, to a network link 620 that is connected to a local network 622. For example, a communication interface 618 may be an integrated services digital network (ISDN) card, cable modem, satellite modem, or a modem to provide a data communication connection to a corresponding type of telephone line. As another example, the one or more communication interfaces 618 may include a local area network (LAN) card to provide a data communication connection to a compatible LAN. As yet another example, the one or more communication interfaces 618 may include a wireless network interface controller, such as a 802.11-based controller, Bluetooth controller, Long Term Evolution (LTE) modem, and/or other types of wireless interfaces. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by a Service Provider 626. Service Provider 626, which may for example be an Internet Service Provider (ISP), in turn provides data communication services through a wide area network, such as the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

In an embodiment, computer system 600 can send messages and receive data, including program code and/or other types of instructions, through the network(s), network link 620, and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. As another example, information received via a network link 620 may be interpreted and/or processed by a software component of the computer system 600, such as a web browser, application, or server, which in turn issues instructions based thereon to a processor 604, possibly via an operating system and/or other intermediate layers of software components.

In an embodiment, some or all of the systems described herein may be or comprise server computer systems, including one or more computer systems 600 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving first metadata associated with a first version of a media content item, wherein the first metadata includes a first plurality of hash value data sequences indicating a plurality of time-based positions in the first version of the media content item;
receiving second metadata associated with a second version of the media content item, wherein the second metadata includes a second plurality of hash value data sequences indicating a plurality of time-based positions in the second version of the media content item;

mapping the first plurality of hash value data sequences to corresponding hash value data sequences of the second plurality of hash value data sequences to create stream timing metadata;

determining segment boundaries of segments within the first version of the media content item and segments within the second version of the media content item;

mapping the segment boundaries of segments within the first version of the media content to corresponding segments within the second version of the media content to create segment metadata; and embedding the stream timing metadata and the segment metadata into the second version of the media content item.

2. The method of claim 1, wherein the first version of the media content item comprises a reference version of the media content item stored at a host media device.

3. The method of claim 1, wherein the second version of the media content item comprises transcoded cloud-storage version of the media content item.

4. The method of claim 3, wherein the second version of the media content item comprises a sequence of portions of the media content item transcoded for HTTP Live Streaming (HLS) protocol.

5. The method of claim 1, wherein the stream timing metadata includes a hash value of a segment of the media content item and a start time value in seconds of the segment of the media content item.

6. The method of claim 1, further comprising:
receiving an input, wherein the input corresponds to a request to play the media content item beginning at a specified point in time;
determining, based on the stream timing metadata, a frame in the second version of the media content item corresponding to the specified point in time; and
causing to be displayed the second version of the media content item beginning with the specified point in time.

7. The method of claim 1, wherein mapping the segment boundaries comprises identifying segment transitions within the media content item.

8. The method of claim 7, wherein the segment transitions include at least one of a change in a style of closed caption text associated with the media content item, a change in an audio level of the media content item, an instance of scene blanking, and a display of a known advertisement.

9. A system comprising:
control circuitry configured to:
receive first metadata associated with a first version of a media content item, wherein the first metadata includes a first plurality of hash value data sequences indicating a plurality of time-based positions in the first version of the media content item;
receive second metadata associated with a second version of the media content item, wherein the second metadata includes a second plurality of hash value data sequences indicating a plurality of time-based positions in the second version of the media content item;
map the first plurality of hash value data sequences to corresponding hash value data sequences of the second plurality of hash value data sequences to create stream timing metadata;
determine segment boundaries of segments within the first version of the media content item and segments within the second version of the media content item;
map the segment boundaries of segments within the first version of the media content to corresponding segments within the second version of the media content to create segment metadata; and
embed the stream timing metadata and the segment metadata into the second version of the media content item.

10. The system of claim 9, wherein the first version of the media content item comprises a reference version of the media content item stored at a host media device.

11. The system of claim 9, wherein the second version of the media content item comprises transcoded cloud-storage version of the media content item.

12. The system of claim 11, wherein the second version of the media content item comprises a sequence of portions of the media content item transcoded for HTTP Live Streaming (HLS) protocol.

13. The system of claim 9, wherein the stream timing metadata includes a hash value of a segment of the media content item and a start time value in seconds of the segment of the media content item.

14. The system of claim 9, wherein the control circuitry is further configured to:
receive an input, wherein the input corresponds to a request to play the media content item beginning at a specified point in time;
determine, based on the stream timing metadata, a frame in the second version of the media content item corresponding to the specified point in time; and
cause to be displayed the second version of the media content item beginning with the specified point in time.

15. The system of claim 9, wherein mapping the segment boundaries comprises identifying segment transitions within the media content item.

16. The system of claim 15, wherein the segment transitions include at least one of: a change in a style of closed caption text associated with the media content item, a change in an audio level of the media content item, an instance of scene blanking, and a display of a known advertisement.

* * * * *